United States Patent
Kaya et al.

(10) Patent No.: US 11,912,578 B2
(45) Date of Patent: Feb. 27, 2024

(54) LOW-TEMPERATURE METHOD FOR BORON CARBIDE PRODUCTION

(71) Applicants: SABANCI UNIVERSITESI, Istanbul (TR); YILDIZ TEKNIK UNIVERSITESI, Istanbul (TR); SABANCI UNIVERSITESI NANOTEKNOLOJI ARASTIRMA VE UYGULAMA MERKEZI SUNUM, Istanbul (TR)

(72) Inventors: Cengiz Kaya, Istanbul (TR); Figen Kaya, Istanbul (TR)

(73) Assignees: SABANCI UNIVERSITESI, Istanbul (TR); YILDIZ TEKNIK UNIVERSITESI, Istanbul (TR); SABANCI UNIVERSITESI NANOTEKNOLOJI ARASTIRMA VE UYGULAMA MERKEZI SUNUM, Istanbul (TR)

( * ) Notice: Subject to any disclaimer, the term of this patent is extended or adjusted under 35 U.S.C. 154(b) by 748 days.

(21) Appl. No.: 16/973,769

(22) PCT Filed: Jun. 13, 2018

(86) PCT No.: PCT/TR2018/050310
§ 371 (c)(1),
(2) Date: Dec. 10, 2020

(87) PCT Pub. No.: WO2019/240692
PCT Pub. Date: Dec. 19, 2019

(65) Prior Publication Data
US 2021/0246035 A1    Aug. 12, 2021

(51) Int. Cl.
*C01B 32/991*    (2017.01)

(52) U.S. Cl.
CPC ........ *C01B 32/991* (2017.08); *C01P 2004/62* (2013.01); *C01P 2004/64* (2013.01)

(58) Field of Classification Search
CPC .............. C01B 32/991; C01P 2004/62; C01P 2004/64; C04B 2235/3409; C04B 2235/421; C04B 35/6263; C04B 35/632; C04B 35/563
See application file for complete search history.

(56) References Cited

U.S. PATENT DOCUMENTS 3,914,371 A    10/1975 Benton et al.

FOREIGN PATENT DOCUMENTS

| CN | 106744969 A | * | 5/2017 |
| CN | 106744969 A | | 5/2017 |
| EP | 1189852 A1 | | 3/2002 |
| GB | 908494 A | | 10/1962 |

OTHER PUBLICATIONS

Kakiage et al. "Low-temperature synthesis of boron carbide powder from condensed boric acid-glycerin product" Materials Letters 65 (2011) p. 1839-1841 (Year: 2011).*

* cited by examiner

*Primary Examiner* — Anthony J Zimmer
*Assistant Examiner* — Syed T Iqbal
(74) *Attorney, Agent, or Firm* — Bayramoglu Law Offices LLC

(57) ABSTRACT

A production method of boron carbide nano-sized particles and/or submicron particles includes the following sequential steps: obtention of a fluid mixture including elemental boron, glycerin and one or more carboxylic acid, wherein a molar ratio of glycerin to the one or more carboxylic acids is within a range between 10:1 and 10:7.5. Heating of the fluid mixture to obtain a first mid-product in a form of a gel including borate ester bonds. Solidification of the first mid-product by heating a reaction product to obtain a second mid-product in solid form. Sintering the second mid-product to obtain boron carbide in a form of particles.

19 Claims, No Drawings

LOW-TEMPERATURE METHOD FOR BORON CARBIDE PRODUCTION

CROSS REFERENCE TO THE RELATED APPLICATIONS

This application is the national stage entry of International Application No. PCT/TR2018/050310, filed on Jun. 13, 2018, the entire contents of which are incorporated herein by reference.

TECHNICAL FIELD

The present invention relates to a method for production of boron carbide nano- and submicron-sized particles.

BACKGROUND

Boron carbide is currently known as the third hardest material in the world. This material is generally used in the form of submicron sized powders as ceramic materials or employed as reinforcement ingredients in composites.

Boron carbide particles are conventionally produced by carbothermal processes, where boron oxide is reduced and carburized by use of carbon at high temperatures. Such high temperatures for the reduction of boron oxide to form boron carbide ceramic particles could be provided by use of electric arc discharge or by sintering starting materials in an inert atmosphere such as argon or nitrogen. In both methods; boron and carbon sources are in the form of particles, mixed with each other in order to increase atomic diffusion between those solid state materials. These processes are therefore named as solid state reduction processes. GB 908 494 A discloses a process which results in synthesis of boron carbide, but only as a by-product in a low purity. U.S. Pat. No. 3,914,371 A discloses a solid-state method of boron carbide bodies larger than nano- or submicron-sized particles.

The reduction and carburization steps take place at quite high temperatures such as 1900° C. or higher. Such temperature values cause at least partial loss of carbon source, high energy consumption.

A further fact which is inevitable at said temperatures is excessive agglomeration of reaction products. Due to said agglomeration, such processes further require milling of final boron carbide powders, which corresponds to a further energy input. Milling further causes chemical contamination in the final product, due to the abrasive wear of metallic or ceramic milling equipment.

As an alternative approach elemental boron and carbon powders may be used in order to avoid reduction of boron oxide. Said aspect results in an inevitable increase in the final product costs, because of the high values of respective starting materials, especially that of carbon powder.

As a result, a simple process is needed to produce boron carbide in the powder form at lower temperatures.

SUMMARY

Primary object of the present invention is to overcome the abovementioned shortcomings of the prior art.

Another object of the present invention is provision of an alternative method for production of boron carbide nanoparticles with cost minimization.

A further object of the present invention is provision of an alternative method for production of boron carbide nanoparticles with minimized chemical contamination.

The present invention proposes a method production of boron carbide nano- and submicron-sized particles, including the following sequential steps: obtention of a fluid mixture including elemental boron, glycerin and one or more carboxylic acid, wherein the molar ratio of glycerin to one or more carboxylic acids is within the range between 10:1 and 10:7.5; heating of said fluid mixture thereby obtaining a first mid-product in the form of a gel comprising borate ester bonds; solidification of said first mid-product by heating the reaction product, thereby obtaining a second mid-product in solid form; and sintering said second mid-product, thereby obtaining boron carbide in the form of particles.

DETAILED DESCRIPTION OF THE EMBODIMENTS

The present invention proposes an optimized method for production of highly crystalline boron carbide nanoparticles and/or submicron-sized particles, i.e. nano- and/or submicron-sized particles, as a final product.

The method according to the present invention includes the following sequential steps:
a) preparation or obtention of a fluid mixture including elemental boron as a boron source, glycerin and one or more carboxylic acids as carbon sources, wherein the molar ratio of glycerin to one or more carboxylic acids is within the range between 10:1 and 10:7.5,
b) keeping said fluid mixture at a temperature of 100° C. or higher, thereby obtaining a first mid-product,
c) solidification of said first mid-product by heating the first mid-product, thereby obtaining a second mid-product in solid form,
d) sintering said second mid-product, thereby obtaining boron carbide in the form of particles.

Notwithstanding that the starting materials used in the method according to the present invention include comparatively low cost solid powders, limitations in reaction speed due to reduced atomic diffusion in the solid form as encountered in the prior art, are eliminated. In the proposed process, the starting materials (i.e. reactants) including the carbon sources and boron sources are mixed and reacted in fluid state, thereby increasing the occurrence of atomic diffusion in the reaction medium, and expediting the related reaction kinetics. Activation energy values in respective step(s) in the reaction mechanism are thus minimized, by the reactants being able to easily diffuse towards each other in the fluid mixture which serves as a reaction medium.

In the step (a), the molar ratio of glycerin to one or more carboxylic acids being within the range between 10:1 and 10:7.5 is observed as an enabling limitation for conversion into the final product. Said molar ratio of glycerin to one or more carboxylic acids is preferably within the range between 10:2.5 and 10:5 for increased efficiency in use of starting materials.

The fluid mixture in the step (a) can further comprise boron oxide (boron trioxide, $B_2O_3$) and/or boric acid ($H_3BO_3$), along with elemental boron as a boron source mixture. In the present context, the elemental boron and the boron source mixture can both be named as "boron source". The total molar amounts of boron oxide and/or boric acid can be equal, higher or less than the molar amount of the elemental boron. Said molar ratio of elemental boron to boron oxide (boron trioxide, $B_2O_3$) and/or boric acid ($H_3BO_3$) is preferably within the range between 10:0.5 and 0.5:10. For further enhancing the extent of gelation of the fluid mixture, the molar ratio of elemental boron to the total molar amount of boron sources in the fluid mixture is preferably within the range between 0.05 and 0.70. Preferably, the total molar amount of boron oxide and/or boric acid is equal to or higher than the molar amount of the elemental boron, for further enhancing said extent of gelation.

The presence of boron oxide and/or boric acid which are directly available or easily derivable from natural minerals, serves for cost reduction thanks to that their respective economic values are lower than that of elemental boron. It is considered that the presence of elemental boron in the fluid mixture speeds up the reduction of boron oxide ($B_2O_3$) into dimeric boron mono oxide ($B_2O_2$). $B_2O_2$, a meta-stable form of boron oxide, can be vaporized with a moderate extent of energy, i.e. said vaporization occurs at low temperatures, during a consolidation (crystallization or calcination) step.

The step (b) results in formation of a first mid product in the form of a gel comprising borate ester (B—O—C) bonds. The present invention makes use of the formation of borate ester bonds between glycerin and carboxylic acids as a result of condensation-dehydration reactions.

Formation of boron ester bonds increases reaction rates between boron and carbon atoms, leading to increased carburization and enhanced crystallinity of the final product. Boric acid as a boron source enhances the extent of formation of said borate ester bonds.

In the step (a), the molar amount of carbon in the carbon source(s) is preferably higher than the molar amount of boron in the boron source or in the boron source mixture, to ensure a substantial or full conversion of boron into boron carbide. To this end, the molar ratio of boron to carbon (i.e. the B:C ratio) is preferably less than 1:2, more preferably less than 1:3, and even more preferably less than 1:4.

The B:C ratio is preferably within the range between 1:2 and 1:9, more preferably between 1:3 and 1:6, and even more preferably between 1:4 and 1:5.5. Said preferences related to the lower limits of ranges (1:9, 1:6 and 1:5.5, respectively) are suggested in order to minimize or preferably substantially eliminate carbon based impurities in the final product by limiting the excess of carbon in terms of boron carbide stoichiometry.

The boron source can be mixed in glycerol. Upon addition of one or more carbon containing acids, e.g. citric acid and/or tartaric acid, glycerol and said acid(s) serve as carbon source. Upon heating up and keeping the fluid mixture at a temperature of 100° C. or higher, a first mid-product is obtained, which can be considered a gel structure. The formation of borate ester bonds and thus the solubility of the boron source is aggravated in higher temperatures.

Accordingly, it is observed that the chemical reactions for gel formation to obtain the first mid-product substantially starts at temperatures of 100° C. or higher. To substantially avoid the decomposition of glycerin, it is preferred that the fluid mixture is kept at temperatures not higher than 290° C.

Although said solubility and thus the obtainment of the final product is enabled by keeping the fluid mixture for even for a few minutes at a temperature of 100° C. or slightly higher, keeping the fluid mixture for a duration of about 45 minutes at temperatures close to 100° C. would be preferred for a substantial conversion of the boron source, (e.g. 90% or higher conversion of the boron source, when the B:C ratio is less than 1:2).

Since the solubility reaches to higher extents at higher temperatures, shorter durations would suffice in achieving such substantial conversions are available even in 5 minutes when said temperature is between 250° C. and 290° C. For keeping the energy consumption low, the temperature is preferably kept between 100° C. and 150° C., for a duration of 45 minutes to 30 minutes, respectively, at the step (b). Accordingly, in the step (b), the heating is preferably performed at a temperature within the range between 100° C. and 290° C. The first mid-product is observed to have a honey-like gel form.

In the step (c), the solidification of the first mid-product can be preferably performed at a temperature within the range between 350° C. and 750° C., more preferably within the range between 450° C. and 650° C. At temperatures lower than 350° C., carbon source(s) may remain partly unconverted, reducing the final product yield. At temperatures higher than 750° C., boron source(s) may remain partly unconverted. So it is convenient to keep the temperature in step (c) between 350° C. and 750° C., and the range between 450° C. and 650° C. provides a more favorable conversion of both carbon and boron sources.

Lower values of B:C ratio would require higher temperatures within these ranges and longer durations in calcination, for effective removal of any carbon residues. In cases where the B:C ratio is lower than 1:5, the final product may include carbon residue which has not been possible to remove by calcination. In cases where the B:C ratio is higher than 1:1, the final product may include unconverted boron.

The duration of calcination in the step (c) can be selected to be within the range between 30 minutes and 180 minutes, more preferably within the range between 60 minutes and 150 minutes. In cases where the calcination is continued for durations shorter than 30 minutes and longer than 180 minutes, reductions are observed in boron carbide yield. In calcination, durations within the range between 60 minutes and 150 minutes are observed to provide favorable boron carbide yields.

Accordingly, the first mid-product in the form of a gel, consolidated (crystallized, or calcinated) at elevated temperatures resulting in a second mid-product which is a substantially black colored powder, is then to be sintered for obtaining boron carbide in the form of particles without necessitating any milling. Accordingly, in the step (d), the sintering temperature can be preferably 1250° C. or higher, more preferably within the range between 1250° C. and 1550° C., even more preferably within the range between 1300° C. and 1500° C. Higher temperatures are not necessary for obtaining the final product, yet sintering temperatures not higher than 1550° C., or even not higher than 1500° C. are preferred for reducing the energy costs related to sintering.

Duration for sintering is preferably 1 hour or longer, more preferably within the range between 1 hour and 6 hour, even more preferably between 3 hours and 5 hours. Particle size in the final product can be controlled by selecting the sintering durations, such that longer sintering durations result in increased particle sizes. It is observed that sintering durations much higher than 6 hours, at least partially result in micron-sized particles instead of nano- or submicron sized particles in the final product.

The sintering can be performed under an inert atmosphere substantially including Argon, for enhancing the boron carbide yield by Argon being inert. Alternatively, the sintering can be performed by keeping the solid product in contact with nitrogen gas, thereby enabling obtention of boron nitride as a side product along with boron carbide which is intended main final product. The nitrogen gas may be used as a mixture thereof with an inert gas, e.g. with Argon.

Boron carbide particles obtained using the proposed method can be in the form of nano- or submicron sized powder, platelets, whiskers, or rods. The method according to the present invention enables production of highly crystalline boron carbide nanoparticles are without necessitating any milling. Furthermore, the method according to the present invention enables controlled size and morphology in the obtained boron carbide nanoparticles, with minimized chemical contamination in the product.

The present invention further proposes the use of the boron carbide particles (final product) obtained with the above described method, in composite structures. Such composite structures will have a reduced cost thanks to the cost advantages of the final product obtained with the method according to the present invention. Furthermore, the controllable size and composition of the final product obtained with the method described above, enables fine tuning of mechanical and chemical properties/behaviors of derivative products of said final product, such as composite structures, in which said final product is employed. Accordingly, the present invention further proposes the use of the final product in composite structures. To this end, the following step can be performed after the step (d):

e) use of the boron carbide obtained in the step (d) in preparation of a composite structure.

Thus the following objects are achieved by the present invention:

overcoming the abovementioned shortcomings of the prior art, and provision of:
an alternative method for production of boron carbide nanoparticles with cost minimization, and
an alternative method for production of boron carbide nanoparticles with minimized chemical contamination.

What is claimed is:

1. A method for a production of boron carbide nano-sized particles and/or submicron-sized particles, comprising the following sequential steps:
   a) preparing a fluid mixture comprising elemental boron, glycerin and one or more carboxylic acids, wherein a molar ratio of the glycerin to the one or more carboxylic acids is within a range between 10:1 and 10:7.5,
   b) keeping the fluid mixture at a temperature within a range between 100° C. and 290° C. to obtain a first mid-product,
   c) performing a solidification on the first mid-product by heating the first-mid product to a temperature within a range between 350° C. and 750° C. to obtain a second mid-product in a solid form,
   d) sintering the second mid-product at a temperature of 1250° C. or higher to obtain the boron carbide nano-sized particles and/or submicron-sized particles.

2. The method according to the claim 1, wherein the fluid mixture further comprises boric acid.

3. The method according to the claim 2, wherein a total molar amount of the boric acid is equal or higher than a molar amount of the elemental boron.

4. The method according to claim 2, wherein the fluid mixture further comprises boron oxide.

5. The method according to the claim 4, wherein a total molar amount of the boron oxide and/or a total molar amount of the boric acid is equal or higher than a molar amount of the elemental boron.

6. The method according to claim 1, wherein a molar ratio of boron to carbon (B:C ratio) is less than 1:2.

7. The method according to the claim 6, wherein the B:C ratio is within a range between 1:2 and 1:9.

8. The method according to claim 1, wherein in step a), the molar ratio of the glycerin to the one or more carboxylic acids is within a range between 10:2.5 and 10:5.

9. The method according to claim 1, wherein in step b), the fluid mixture is heated to a temperature within a range between 100° C. and 150° C.

10. The method according to claim 1, wherein the solidification of the first mid-product in step c) is performed at a temperature within a range between 450° C. and 650° C.

11. The method according to claim 1, a duration of a calcination in step c) is within a range between 30 minutes and 180 minutes.

12. The method according to claim 1, wherein in step d), the sintering is performed under an inert atmosphere substantially comprising Argon, or by keeping the second mid-product in contact with nitrogen gas.

13. The method according to claim 1, wherein in step d), the sintering is performed at a temperature within a range between 1250° C. and 1550° C.

14. The method according to claim 1, wherein in step d), the sintering is performed for a duration of 1 hour or longer.

15. The method according to claim 1, wherein the fluid mixture further comprises boron oxide.

16. The method according to claim 2, wherein a molar ratio of boron to carbon (B:C ratio) is less than 1:2.

17. The method according to claim 3, wherein a molar ratio of boron to carbon (B:C ratio) is less than 1:2.

18. The method according to claim 4, wherein a molar ratio of boron to carbon (B:C ratio) is less than 1:2.

19. The method according to claim 5, wherein a molar ratio of boron to carbon (B:C ratio) is less than 1:2.

* * * * *